(No Model.)

C. O. C. BILLBERG.
DYNAMO ARMATURE.

No. 401,632. Patented Apr. 16, 1889.

Witnesses.
David S. Williams
Alex. Darkoff

Inventor:
Curl O. C. Billberg
by his Attorneys
Howson + Howson

UNITED STATES PATENT OFFICE.

CARL O. C. BILLBERG, OF PHILADELPHIA, ASSIGNOR TO THOMAS H. DALLETT AND GEORGE A. DALLETT, OF THORNBURY, PENNSYLVANIA.

DYNAMO-ARMATURE.

SPECIFICATION forming part of Letters Patent No. 401,632, dated April 16, 1889.

Application filed October 1, 1888. Serial No. 286,816. (No model.)

*To all whom it may concern:*

Be it known that I, CARL O. C. BILLBERG, a subject of the King of Sweden, residing at Philadelphia, Pennsylvania, have invented certain Improvements in Dynamo-Electric Machines and Motors, of which the following is a specification.

The object of my invention is to so construct an armature for a dynamo-electric machine or electric motor as to lessen the liability of the heating of the iron in the pole-pieces and to increase the efficiency of the machine.

Figure 1:
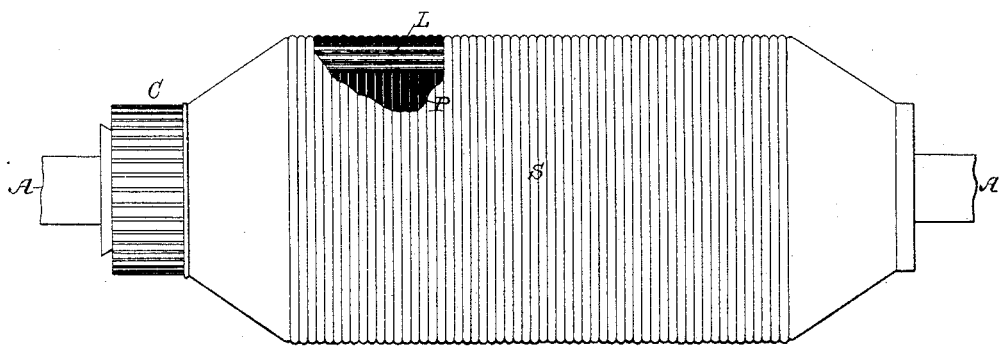
Figure 2:
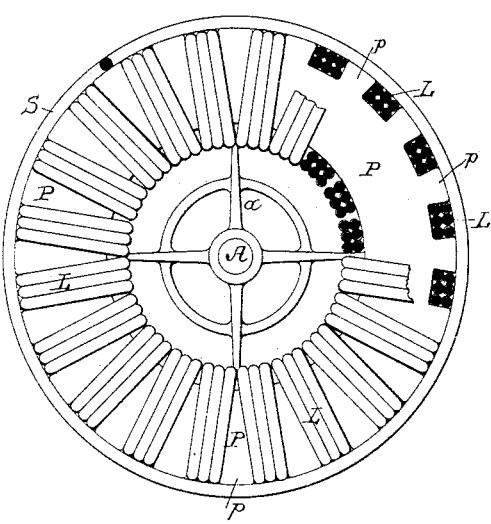
Figure 3:
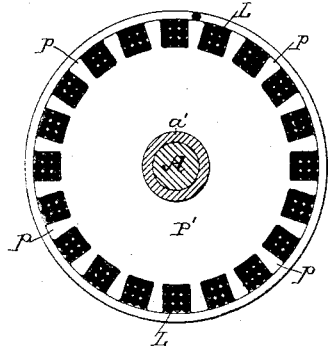

In the accompanying drawings, Figure 1 is a longitudinal elevation of my improved armature with a portion in section. Fig. 2 is an end view of a ring-armature in accordance with my invention, and showing some of the conductors in sections; and Fig. 3 is a sectional view of a drum-armature embodying my improvements.

As will be seen from the foregoing illustrations, my invention may be applied either to a ring-armature or a drum-armature. In either case the iron core is formed of a series of juxtaposed iron plates either in the form of rings or disks and with the electrical conductors wound over the core. It is now a generally-accepted theory that it is rather an objection than an advantage to provide these plates or disks which go to form the armature with projecting teeth constituting polar projections, although it was for some time the custom to construct the armature-cores with these projections or teeth and to wind the insulated conductors in the spaces between these projections. The objection which has been made to the use of projections is that they tend to produce eddy-currents in the iron field-pieces, particularly as each polar projection leaves the pole-pieces of the field-magnet in the revolution of the armature. Owing to these eddy-currents the iron core of the field-magnets becomes heated and the efficiency of the machine considerably lessened. I believe, however, that these polar projections on the armature-core, by reducing the resistance of the air-space, possess certain advantages which would increase the efficiency of the machine if the production of these eddy-currents and consequent heating of the core in the field-magnet could be gotten rid of.

My present invention consists of a means for avoiding the production of these eddy-currents and the consequent heating of the core.

In the accompanying drawings, A is the armature-shaft, which in the case of a ring-armature carries a suitable spider, $a$, on which are mounted the ring-plates P, constituting the core of the armature. In the case of a drum-armature the shaft carries the sleeve $a'$, on which are mounted the plates P', which go to make up the core. In either case the plates P or P' have around their peripheries projecting teeth $p$, which when the plates are put together constitute polar connections or teeth on the armature-core. In the spaces between these polar projections or teeth are wound the insulated conductors L, the terminals of which are suitably connected to a commutator C, Fig. 1. Around the armature thus formed I then place a divided sheath of iron, which, as a matter of constructional convenience, I make of insulated iron wire, S, wound circumferentially over the armature throughout the length of the polar projections. This divided iron sheath may, if desired, be in magnetic contact with the polar projections of the armature-core; but I do not regard actual contact as essential.

When the machine is in operation, I find that by the presence of this divided iron sheath the heating of the core is greatly lessened, if not entirely prevented, and the efficiency of the machine considerably increased. In other words, the presence of this divided iron sheath between the polar projections and the iron core and the poles of the field-magnet has the effect of almost entirely getting rid of the eddy-currents which usually follow from the use of the polar projections on the armature-core.

I claim as my invention—

1. An armature-core for a dynamo-electric machine or electric motor, having an iron core with polar projections or teeth and a divided iron sheath around the outside of the armature throughout the length or part of the length of the polar projections.

2. An armature for a dynamo-electric machine or electric motor, having a divided iron core with polar projections and a divided iron sheath composed of iron wire wrapped around the armature circumferentially throughout the length or part of the length of the polar projections.

In testimony whereof I have signed my name to this specification in the presence of two subscribing witnesses.

CARL O. C. BILLBERG.

Witnesses:
 HENRY HOWSON,
 HARRY SMITH.